March 10, 1970  E. G. PHLAUM  3,499,423
LIQUID HEATERS HAVING TEMPERATURE BUILDUP PROTECTION
Filed April 4, 1968

INVENTOR.
Edward G. Phlaum
BY Andrus & Starke
Attorneys

United States Patent Office 3,499,423
Patented Mar. 10, 1970

3,499,423
LIQUID HEATERS HAVING TEMPERATURE BUILDUP PROTECTION
Edward G. Phlaum, Kankakee, Ill., assignor to A. O. Smith Corporation, Milwaukee, Wis., a corporation of New York
Filed Apr. 4, 1968, Ser. No. 718,801
Int. Cl. F24b 1/08
U.S. Cl. 122—14
4 Claims

ABSTRACT OF THE DISCLOSURE

The present disclosure relates to a hot water heater tank having a bottom fired burner which is controlled by a thermostat sensing the water temperature in the lower portion of the tank. A conduit connects the cold water line or the lower portion of the tank to the upper portion of the tank with a motor-pump unit connected in the line to transfer cold water from the lower portion of the tank to the upper portion. A secondary sensing unit is also connected in the upper portion of the tank. If the temperature in the upper portion of the tank rises above a selected level, cold water is pumped from the bottom to the top of the tank until the over temperature condition is eliminated at which time the pump means shuts off.

---

Figure 1:
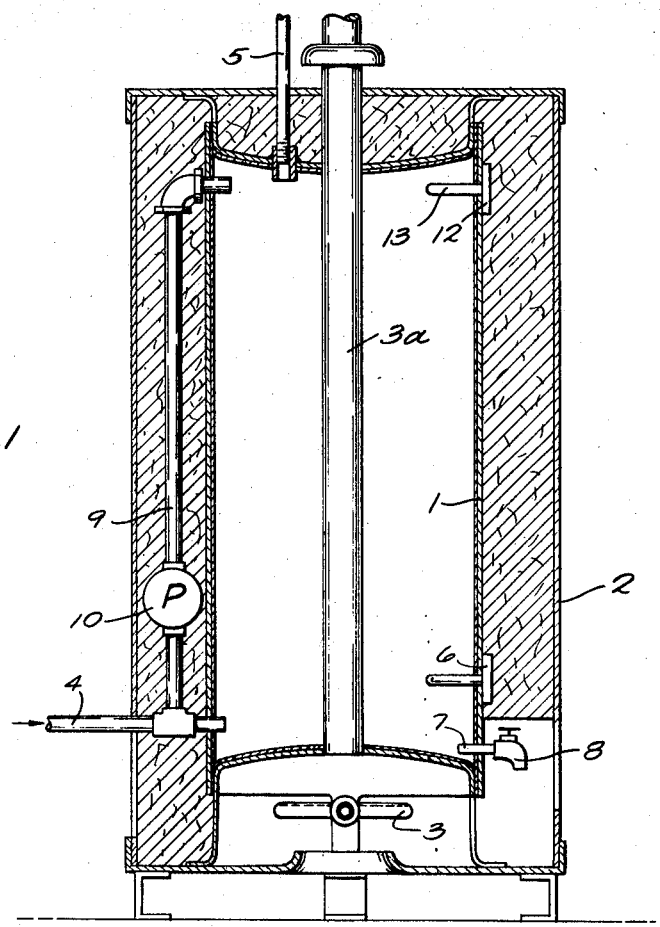

This invention relates to liquid heaters having temperature buildup protection and particularly to liquid heaters, including a storage container with the heat input being applied to the lower portion of the container and with the heated liquid being withdrawn from the upper portion thereof.

Hot water heaters and the like may employ a storage tank with the heat applied to the bottom of the storage tank. The cold water inlet is provided adjacent to the bottom of the tank. The heated liquid rises and is withdrawn from the upper end portion of the tank. A thermostat at the bottom or intermediate portion of the tank is provided to insure a continued source of hot water adjacent the outlet.

A severe problem in connection with such bottom fired water or other liquid heaters is the undesirable heating of the hot water in the upper portion of the tank when the cold water is introduced into the bottom of the tank and causes the thermostat to turn on the heater. It is necessary to immediately heat the cold water to maintain a continuous source. If this were not done, the withdrawal of the hot water would cause the rising of the cold water into the tank and require an unduly long time to heat the water as it rises. However, with the present systems, the heating inherently causes increased heating of the previously heated water adjacent the hot outlet above the desired level. It has been suggested that the overheating effect may be minimized by circulating the water from the upper portion of the tank through the supply lines to keep hot water immediately available at the faucets or the hot water be recirculated from the top to the bottom of the tank. Applicant has found that neither of these systems provide a highly desirable means of maintaining accurate control of the hot water in the upper portion of the tank.

The present invention is directed to a simple and reliable over temperature control to prevent undue buildup of temperature as a result of the heating of the incoming cold liquid. Generally in accordance with the present invention, a secondary temperature sensing means is provided in the upper portion of the tank. A cold water transfer means also interconnects the lower portion of the tank, or the cold water line, to the upper portion of the tank with suitable pump means connected in the line to transfer cold water from the lower portion of the tank to the upper portion. If the temperature in the upper portion of the container or tank rises above a selected level, the liquid is pumped from the bottom to the top of the tank until the over temperature condition is eliminated at which time the pump means shuts off. The liquid in the upper portion of the tanks is limited to a selected maximum buildup temperature and is readily reduced to the desired temperature while maintaining a selected hot temperature water or liquid available at the outlet.

The drawing furnished herewith illustrates a preferred construction of the present invention in which the above advantages and features are clearly disclosed as well as others which will be readily understood from the following description.

Figure 2:
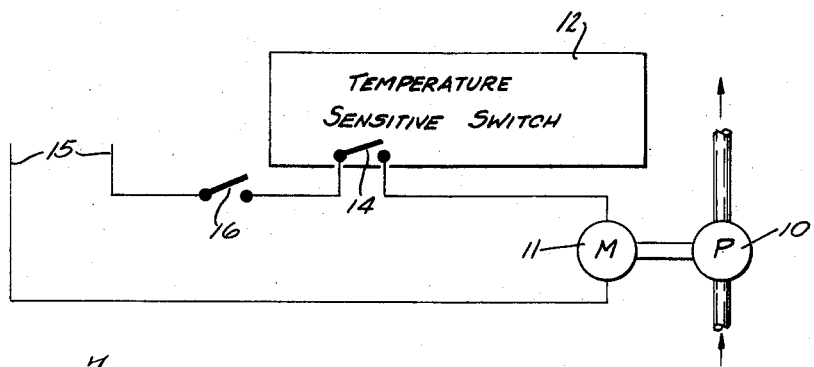

In the drawing:
FIG. 1 is a diagrammatic illustration of a hot water heater tank with parts broken away and sectioned to show details of the construction in accordance with the present invention; and
FIG. 2 is a schematic circuit diagram showing the pump control for the present invention.

Referring to the drawings and particularly to FIG. 1, the present invention is shown applied to a hot water storage tank 1 having an outer decorative insulating jacket and cover 2. A heating source 3 is mounted immediately below the tank 1 within the decorative cover 2 and is diagrammatically shown as a gas fired burner and centrally located flue 3a extending upwardly through tank 1, although any other desired source can of course be employed. A cold water inlet or conduit 4 is secured to the side of the tank adjacent the bottom portion of the tank 1 to introduce cold water into the corresponding portion of the tank. A hot water outlet conduit 5 is secured immediately adjacent the uppermost end of the tank 1 to withdraw the hot water from within the tank. A thermostat 6 is mounted in the lower portion of the tank 1 and is connected through any suitable control unit not shown to automatically control the firing of the burner 3. As the hot water is drawn from the top of the tank 1, the heated water rises and additional cold water enters through the bottom inlet conduit 4. When cold water is introduced into the lower portion of the tank, the burner 3 is ignited to introduce heat into the tank 1 and immediately heat the cold water which subsequently rises and thereby maintains a continuous source of hot water at the conduit 5. Storage tanks of this variety are well known and generally include a drain outlet 7 immediately adjacent the bottom wall of the tank 1 and with a valve 8 enabling the draining of the tank for cleaning purposes and the like.

The present invention is particularly directed to prevention of the undesirable overheating of the water adjacent the outlet conduit 5 as a result of the inherent additional heating of the hot water whenever cold water is introduced into the lower portion of the tank 1. Thus, the flue products and the flue 3a above the thermostat 6 provide additional heating of the water as well as the liquids which do not exchange all of their heat by convection currents below the level of thermostat 6.

In accordance with the present invention, a recirculating cold water conduit 9 is interconnected to the cold water line 4 and to the upper end of the tank through a suitable tank connection. A pump 10 is provided in the line and is driven from a suitable electric motor 11 in the illustrated embodiment of the invention. The motor pump unit is generally a one-way pumping means providing for transfer of liquid only from the bottom to the top of the top of tank 1. If desired, the line 9 may of course be connected directly to the lower portion of the tank 1, to the drain line 7 or the like. Similarly, the opposite end of line 9 may be connected to the hot water line 5. For example, if a dip tube inlet is employed, the cold water connection of line 9 may be more conveniently made in one of the alternatives. A thermostatic switch unit 12 is secured to the upper portion of the tank 1 and includes a sensing unit 13 extending inwardly into the hot water immediately adjacent the outlet conduit 5. The sensing unit 13 is interconnected to control a switch 14 as schematically shown in FIG. 2.

FIG. 2 is a schematic circuit showing the power connection for the motor 11 and includes commercially available alternating current power lines 15 interconnected to the motor 11 in series with the thermostatic switch 14 as well as a manual control power interruption switch 16. The manual control switch 16 may be provided to cut out the bypass circuit if desired. The switch 14 is open with the hot water below a selected temperature. If the hot water rises above a selected temperature, the increased temperature is sensed by the sensing unit 13 to close the switch 14 and thereby apply power to the motor 11. This will immediately result in the circulation of cold water from the lower portion of the tank, upwardly through conduit 9 into the hot water. The cooler water will, of course, reduce the temperature of the overheated water in the top of the tank. As soon as the over-temperature condition is eliminated, the temperature at the sensing unit is correspondingly reduced and the switch 14 opens.

The present invention has been found to provide a simple reliable and inexpensive means for preventing over-temperature conditions in hot water heaters and the like.

Various modes of carrying out the invention are contemplated as being within the scope of the following claims particularly pointing out and distinctly claiming the subject matter which is regarded as the invention.

I claim:

1. In a liquid heater apparatus, a liquid container having means to supply heat to the liquid in a spaced relation to the upper portion of the container, means to introduce liquid into the lower portion of the heater, controlled transfer means for selective transfer of liquid from the lower portion to the top portion of the container to prevent abnormal temperature buildup of the liquid in the upper portion of the container, and temperature responsive means to sense the temperature in the upper portion of the container and to actuate said transfer means in response to a temperature above a selected level.

2. The liquid heater of claim 1 having an underfired heating means disposed beneath said container, a thermostatic control sensing the liquid temperature in the lower portion of the container and connected to operate the heating means in response to a selected minimum temperature, said transfer means including a transfer conduit connected between the bottom and top portions of the container, and a motor-driven pump in said transfer conduit, and said temperature responsive means being connected to the upper portion of the container to sense the temperature of the liquid in the upper portion of the container and having switch means connecting a power input means to said motor-driven pump.

3. In a water heater apparatus, a container having a cold liquid inlet adjacent the lower portion of the container and a hot water outlet adjacent the upper portion of the container, controlled transfer means for transfer of water from the lower portion to the upper portion of the container and temperature responsive means to sense the water temperature in the upper portion of the container and to actuate said transfer means in response to a temperature above a selected level.

4. The liquid heater of claim 3 having a heating means disposed adjacent the lower portion of said container, a thermostatic control sensing the water in the lower portion of the container and connected to operate the heating means in response to a selected minimum temperature, said transfer means including a transfer conduit between the lower and upper portions of the container, and a motor-driven pump in said transfer conduit and said temperature responsive means including a switch connecting a power input means to said motor-driven pump.

References Cited

UNITED STATES PATENTS

| 1,863,273 | 6/1932 | Hofferbert | 126—362 XR |
| 2,348,901 | 5/1944 | Handley | 122—14 |

FOREIGN PATENTS 929,321   7/1947   France.

KENNETH W. SPRAGUE, Primary Examiner

U.S. Cl. X.R.

126—362